United States Patent [19]

Patzelt et al.

[11] Patent Number: 5,676,317
[45] Date of Patent: Oct. 14, 1997

[54] METHOD AND APPARATUS FOR COMBINED GRINDING OF AT LEAST TWO MATERIALS OF DIFFERING GRINDABILITY

[75] Inventors: Norbert Patzelt; Gotthardt Blasczyk, both of Beckum, Germany

[73] Assignee: Krupp Polysius AG, Germany

[21] Appl. No.: 556,386

[22] Filed: Nov. 13, 1995

[30] Foreign Application Priority Data

Dec. 7, 1994 [DE] Germany .................. 44 43 588.6

[51] Int. Cl.[6] .................................................. B02C 19/00
[52] U.S. Cl. ........................ 241/24.1; 241/29; 241/80
[58] Field of Search ......................... 241/80, 97, 19, 241/29, 24.1, 24.12, 152.2, 78, 79.1, 76

[56] References Cited

U.S. PATENT DOCUMENTS

| | | | |
|---|---|---|---|
| 4,703,897 | 11/1987 | Beisner et al. | 241/152.2 X |
| 5,110,056 | 5/1992 | Blasczyk et al. | 241/80 X |
| 5,375,776 | 12/1994 | Kupper et al. | 241/80 X |
| 5,392,998 | 2/1995 | Suessegger et al. | 241/80 X |
| 5,462,234 | 10/1995 | Patzelt et al. | 241/152.2 X |
| 5,529,248 | 6/1996 | Sawamura et al. | 241/80 X |

FOREIGN PATENT DOCUMENTS 3314103 10/1984 Germany .

*Primary Examiner*—Mark Rosenbaum
*Attorney, Agent, or Firm*—Learman & McCulloch

[57] ABSTRACT

The invention relates to a method as well as to apparatus for combined grinding of at least two materials of differing grindability, such as clinker and limestone, wherein the material which is more difficult to grind is pre-crushed to a Blaine fineness of grinding of at least 700 $cm^2/g$ and there-after is further ground together with the other material to produce the finished material.

5 Claims, 3 Drawing Sheets

METHOD AND APPARATUS FOR COMBINED GRINDING OF AT LEAST TWO MATERIALS OF DIFFERING GRINDABILITY

The invention relates to a method and to apparatus for combined grinding of at least two materials of differing grindability.

BACKGROUND OF THE INVENTION

DE-C-33 14 103, discloses a grinding process for materials of differing grindability wherein the material which is more difficult to grind is pre-crushed and afterwards is further ground together with the other material to produce the finished material. In this known method the material which is more difficult to grind is pre-crushed in the roll gap of a roll press using the principle of material bed crushing before being ground in combination with the material which is easier to grind. The pre-treated material leaving the roll Sap of the roll press is then delivered to the combined grinding process together with the more easily grindable material which has not been pre-treated. By comparison with a method without pre-crushing of the material which is more difficult to grind this method is distinguished by a marked saving of energy.

The object of the invention is to make further improvements in in such a way that the properties of the finished material are improved.

This object is achieved of in that the material which is more difficult to grind is ground to a Blaine fineness of grinding of at least 700 cm$^2$/g, but preferably at least 1000 cm$^2$/g, before the further grinding.

SUMMARY OF THE INVENTION

In the combined grinding of clinker and limestone for the production of cement, the finished material produced using the method according to the invention has a higher strength if it is ground to the same fineness of the finished product as conventional finished material. Since the strength of the finished material depends essentially upon the fineness of the clinker, the proportion of much more economical limestone can be increased in the finished material produced according to the invention if a higher strength is not necessary.

THE DRAWINGS

Further advantages end embodiments of the invention will be explained in greater detail with the aid of the following description and the drawings in which.

DETAILED DESCRIPTION

Figure 1:
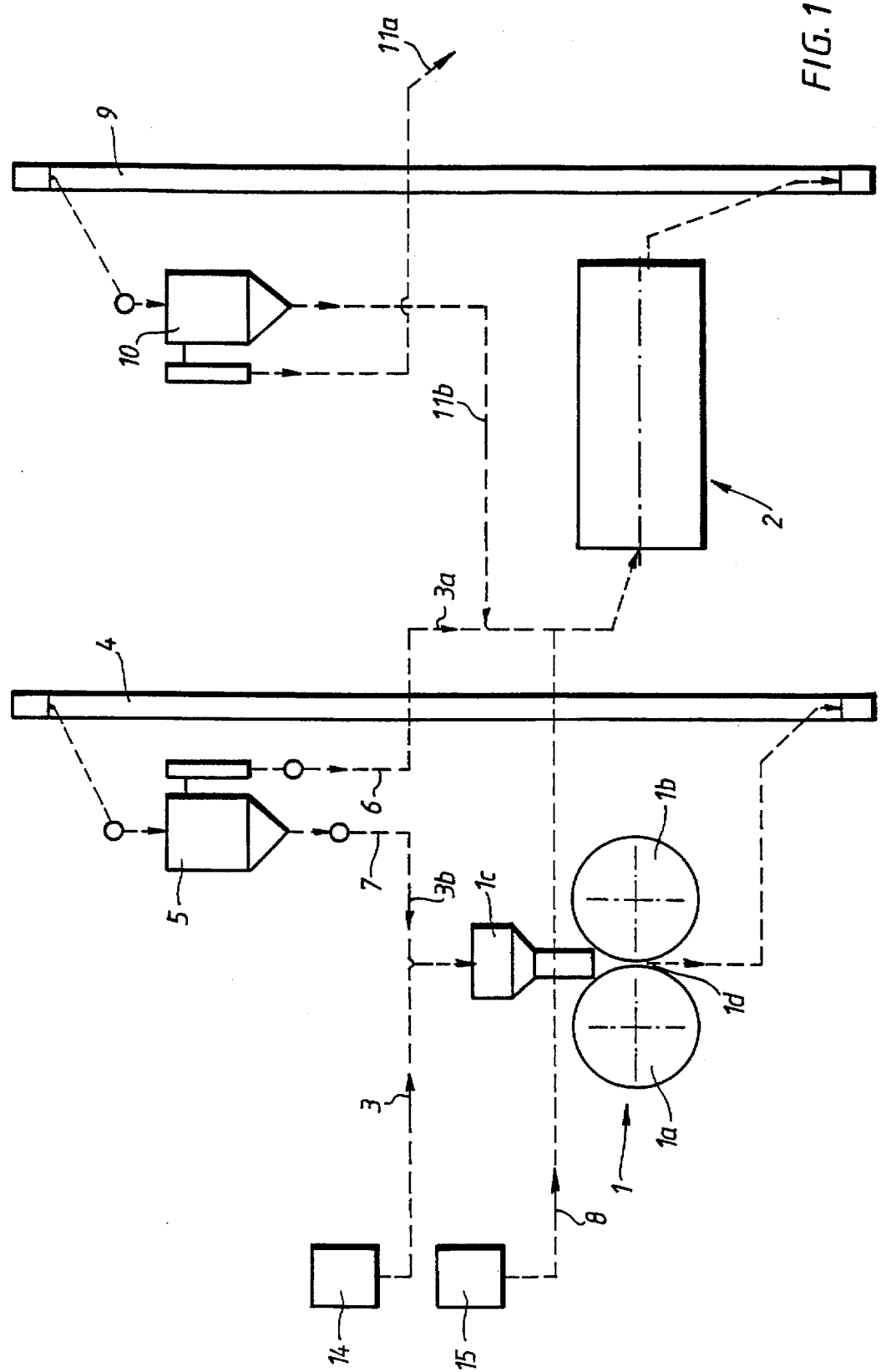
FIG. 1 shows a schematic representation of a first apparatus according to the invention for combined grinding of at least two materials of differing grindability.
Figure 2:
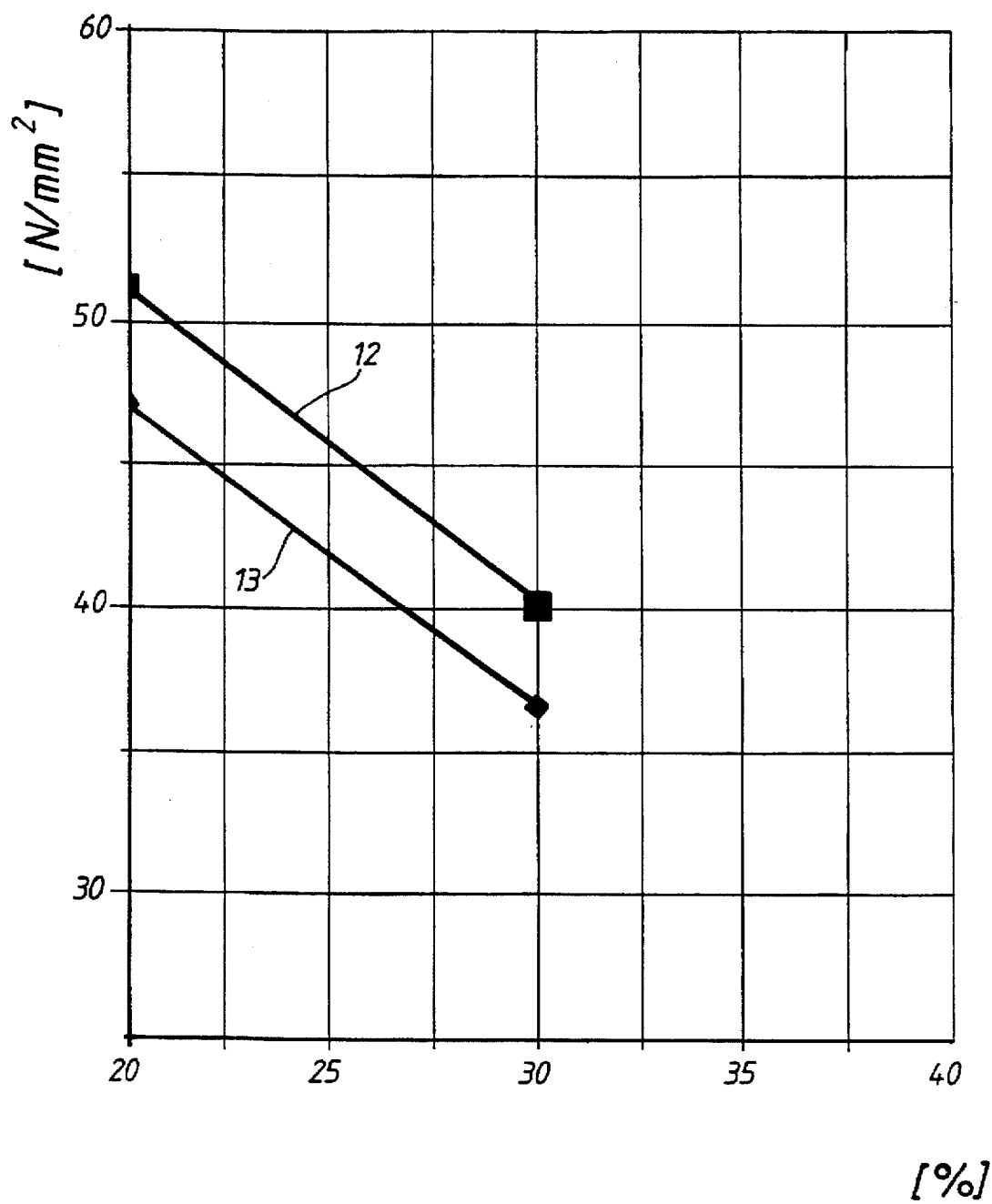
FIG. 2 shows a diagram in which the proportion of limestone is plotted relative to the strength for clinkers subjected to different pre-crushing.

The first apparatus according to the invention shown in FIG. 1 for combined grinding of at least two materials of differing grindability is a so-called combination grinding installation with a first mill 1 and a second mill 2.

The first mill 1 is preferably Formed by a material bed roll mill which has two grinding rolls 1a, 1b pressed against one another at high pressure. A material 3 which is more difficult to grind is first of all pre-crushed in this first mill 1 before it is further ground in the second mill 2 together with a more easily grindable material 8 to produce the finished material.

In the pre-crushing of the material which is more difficult to grind, this material is first of all delivered from a first storage bunker 14 to a feed shaft 1c of the first mill 1. In the roll gap 1d between the two grinding rolls 1a, 1b a pressure of more than 2 t/cm of roll length acts on the material 3 and in this way the material is crushed under pressure according to the principle of material bed crushing and, if appropriate, of individual grain crushing.

The pre-crushed material leaving the roll gap 1d is delivered by way of a suitable first conveyor arrangement 4, for example a bucket elevator, to a separating arrangement 5, which is formed for example by a generally known high-capacity classifier. This separating arrangement divides the pre-crushed material from the first mill 1 into a first part-quantity or relatively fine fraction 3a with a Blaine fineness of grinding of at least 700, preferably 1000 cm$^2$/g and a remaining second part-quantity or relatively coarse recycle fraction 3b. Whilst the first part-quantity 3a is passed on to the second mill 2 by first conveying means 6, the second part-quantity 3b is returned by second conveying means 7 to the feed shaft 1c and thus to the first mill 1.

The material 3 which is more difficult to grind runs through this first grinding circuit which is formed essentially by the first mill 1, the first conveyor arrangement 4 and the separating arrangement 5 until it has a Blaine fineness of grinding of at least 700, preferably at least 1000 cm$^2$/g.

This pre-crushed material is then further ground together with the more easily grindable material 8 in the second mill 2 to produce the finished material. The material 8 is delivered from a storage bunker 15 by way of suitable proportioning means and passed on to the second mill 2. This second mill 2 is formed for example by a generally known tube mill and is a component of a second grinding circuit, which also has a second conveyor arrangement 9 as well as a second separating arrangement 10.

The second conveyor arrangement 9 can again be formed for example by a bucket elevator and the second separating arrangement 10 by a high-capacity classifier. The materials ground together in the second mill 2 pass by way of the second conveyor arrangement 9 to the second separating arrangement 10. In this separating arrangement the material is again divided according to its fineness into two part-quantities. The part-quantity which has the desired fineness of the finished product is drawn off as finished material 11a, whereas the remaining part-quantity 11b is returned to the second mill 2 as recycled material.

The method according to the invention can be used particularly advantageously in the production of composite cement. Composite cements can generally be produced by separate or combined grinding of the individual materials. In the case of separate grinding the finenesses and grain size distributions of the individual components can be freely chosen. Thus the quality parameters of the composite cements can be influenced in such a way that an optimum is achieved as regards energy requirement and strength development.

In the case of combined grinding the individual components cannot be influenced as regards fineness and grain size distribution. Experience has shown that the harder component will collect in the coarse range and the softer component in the fine range of the composite cement. In this case an over-grinding of the softer component occurs which is unfavourable in energy terms. The method disclosed in DE-C-33 14 103 therefore provides that the material which is more difficult to grind is first of all pre-crushed in a material bed roll mill. Thus the aim is to adjust the grain size distribution and fineness of the individual components.

However, in the experiments on which the invention is based it has been shown that pre-crushing with only one pass through the material bed roll mill does indeed achieve a marked saving of energy, but the effects on the properties of the finished material, particularly its strength, are relatively insignificant, since the finenesses of the two materials hardly alter in the finished material. The following overview should explain this in greater detail with the aid of three examples, wherein in the first example there is no pre-grinding of the material which is more difficult to grind, in the second example the material which is more difficult to grind has been pre-crushed by a single pass through the material bed roll mill, and in the third example the finished material has been produced by the method according to the invention. In the following examples the grain size of the starting materials was 0 to 30 mm and the finished material consisted of 75% clinker end 25% possolana and was ground to a Blaine fineness of the finished product of 4500 cm²/g.

| Example | Grinding | Finished material |
|---|---|---|
| 1 | clinker: — | clinker: 3,600 |
|   | pozzolana: — | pozzolana: 7,200 |
| 2 | clinker: 400 cm²/g | clinker: 3,700 |
|   | pozzolana: — | pozzolena: 7,100 |
| 3 | clinker: >1000 cm²/g | clinker: >4000 |
|   | pozzolana: — | pozzolana: >6000 |

As can be seen from the above table, only when the material which is more difficult to grind passes through the material bed roll mill a number of times is there a marked difference to be seen in the finenesses of the finished material. This effect already occurs if the material which is more difficult to grind is allowed to run at least twice through the mill 1. This results in a Blaine fineness of approximately 700 cm²/g. Particularly good results are shown, however, if the material which is more difficult to grind is pre-crushed to at least 1,500 cm²/g.

In a Further experiment clinker and limestone were ground together to a Blaine fineness of the finished product of 3,800 cm²/g. In addition, the proportion of limestone was varied between 20 and 30%.

In the result represented in FIG. 8, the proportion of limestone is shown in % relative to the 28-day compression strength (DIN EN 196) in N/mm². In this case the curve 12 shows a finished product in which the clinker had been precrushed to a fineness of 2300 cm², whilst in the finished material according to the curve 13 a combined grinding of clinker and limestone has taken place immediately.

As can be seen from the curve, an increase in the strength of almost 10% can be achieved by the pre-crushing of the material which is more difficult to grind. On the other hand, according to the above examples the proportion of limestone could be increased by approximately 7% if a higher strength is not required. Since the proportion of limestone is considerably more economical than clinker, the production and energy costs can be additionally reduced as a result.

Figure 3:
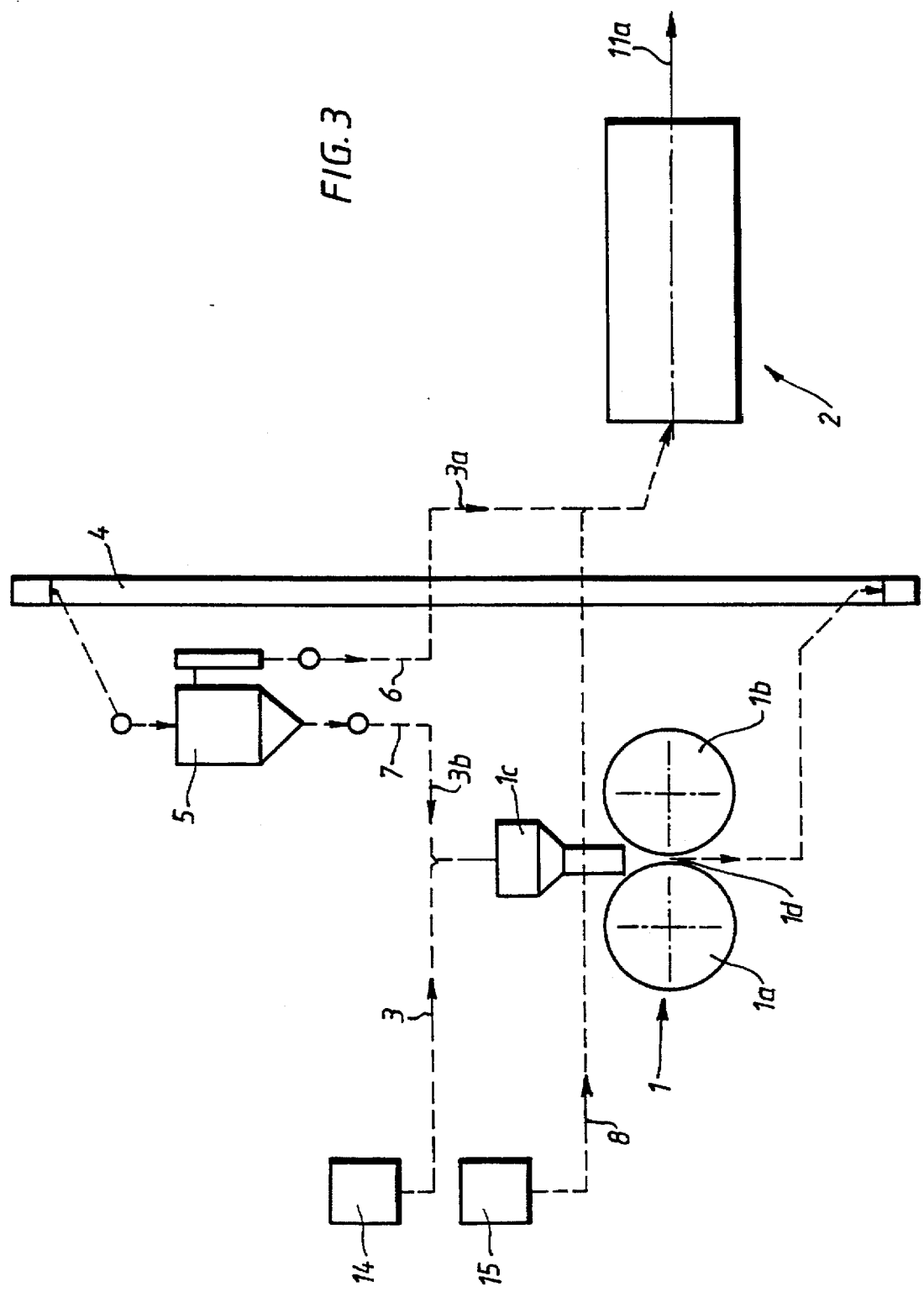
FIG. 3 shows a schematic representation of a second apparatus according to the invention for combined grinding of at least two feed materials of differing grindability.

FIG. 3 shows a second apparatus according to the invention which differs from the apparatus according to FIG. 1 only in that the second mill 2 does not co-operate with a second separating arrangement. As a result the more easily grindable material 8, together with the material which is more difficult to grind which has been pre-crushed to a certain fineness, is ground immediately in the second mill 2 to the fineness of the finished product. Since no oversize material is returned to the mill inlet of the second mill, the material which is more difficult to grind, for example the clinker, is to some extent more finely ground than in the first embodiment, resulting in an even better strength development in the finished product.

We claim:

1. A method of combined grinding at least two materials one of which is more difficult to grind than the other, said method comprising the steps of:

precrushing said one material independently of said other material in a first mill to obtain a relatively coarse fraction and a relatively fine fraction having a minimum Blaine ground fineness of at least 700 cm²/g;

separating said relatively coarse and fine fractions;

combining said relatively fine fraction and said other material; and grinding the combined relatively fine fraction and said other material to produce a finished composite product.

2. The method of claim 1 wherein said relatively fine fraction has a Blaine ground fineness of at least 1000 cm²/g.

3. The method of claim 1 wherein precrushing of said one material is effected by a material bed roll mill.

4. The method of claim 1 including returning the relatively coarse fraction to the first mill for further crushing.

5. The method of claim 4 wherein said first mill is a material bed roll mill.

* * * * *

UNITED STATES PATENT AND TRADEMARK OFFICE
CERTIFICATE OF CORRECTION

PATENT NO. : 5,676,317
DATED : October 14, 1997
INVENTOR(S) : Norbert Patzelt et al It is certified that error appears in the above-indentified patent and that said Letters Patent is hereby corrected as shown below:

Column 1, line 21, change "Sap" to -- gap --; line 30, cancel "of"; line 49, change "end" to -- and --.

Column 3, line 24, change "end" to -- and --; line 50, change "8" to -- 2 --.

Signed and Sealed this

Twenty-third Day of December, 1997

Attest:

BRUCE LEHMAN

Attesting Officer

Commissioner of Patents and Trademarks